United States Patent
Mezaael

(10) Patent No.: US 12,057,010 B2
(45) Date of Patent: Aug. 6, 2024

(54) DYNAMIC VEHICLE DATA STRUCTURE AND CONFIGURATION ADJUSTMENT

(71) Applicant: FORD GLOBAL TECHNOLOGIES, LLC, Dearborn, MI (US)

(72) Inventor: Abraham Mezaael, Southfield, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 652 days.

(21) Appl. No.: 17/350,098

(22) Filed: Jun. 17, 2021

(65) Prior Publication Data

US 2022/0406172 A1  Dec. 22, 2022

(51) Int. Cl.
*G08G 1/01* (2006.01)
*H04W 4/021* (2018.01)

(52) U.S. Cl.
CPC ......... *G08G 1/0112* (2013.01); *G08G 1/0141* (2013.01); *H04W 4/021* (2013.01)

(58) Field of Classification Search
CPC .... G08G 1/0112; G08G 1/0141; H04W 4/021
See application file for complete search history.

(56) References Cited

U.S. PATENT DOCUMENTS

| | | |
|---|---|---|
| 8,378,815 B1 | 2/2013 | McNulty et al. |
| 8,766,791 B2 | 7/2014 | Koean et al. |
| 2013/0317732 A1 | 11/2013 | Borg et al. |
| 2019/0090109 A1* | 3/2019 | Moreira de Carvalho ............... H04W 4/50 |

* cited by examiner

*Primary Examiner* — Curtis B Odom
(74) *Attorney, Agent, or Firm* — Joseph Zane; Brooks Kushman P.C.

(57) ABSTRACT

A vehicle wirelessly receives configuration data defining data-gathering and data-reporting parameters associated with at least one context. The vehicle defines data to be gathered by the vehicle related to the context and, as the vehicle travels, gathers the defined data. The vehicle compares the gathered data to the at least one context to determine if there is a correlation between at least one of the at least one contexts and the gathered data, and responsive to there being a correlation, sets vehicle data-gathering and data-reporting based on the parameters associated with the context to which the gathered data correlates.

20 Claims, 3 Drawing Sheets

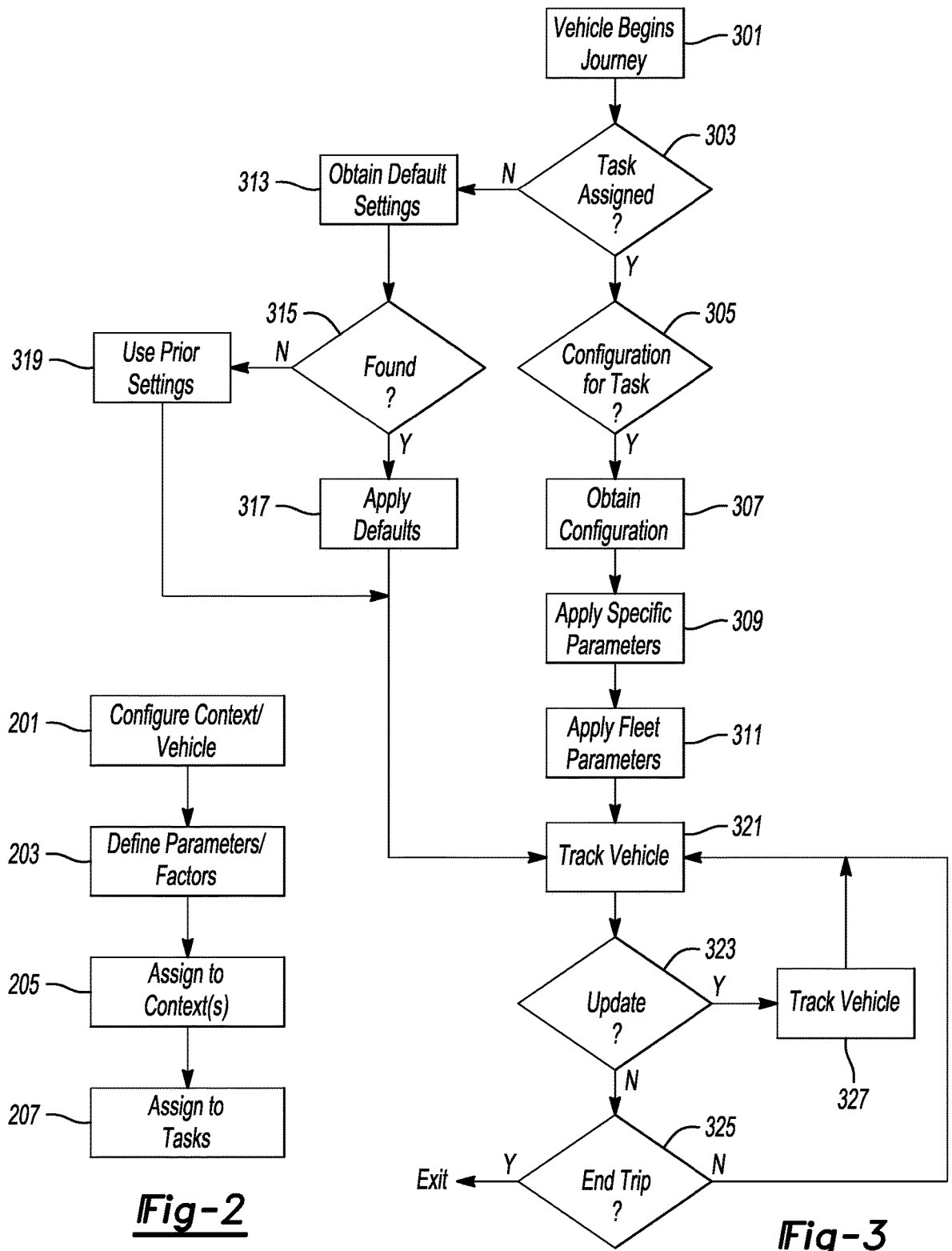

DYNAMIC VEHICLE DATA STRUCTURE AND CONFIGURATION ADJUSTMENT

TECHNICAL FIELD

The illustrative embodiments generally relate to dynamic vehicle data structures and configuration adjustments.

BACKGROUND

Geofencing is the notion of creating a digital fence around an area bounded by known coordinates. Such fences are often used in conjunction with navigation systems, to determine areas of interest or areas to which a vehicle computer is to react in some manner. For example, a gas station may be bounded by a geofence representing a 0.5 mile coordinate set encompassing the gas station, and a vehicle needing gas and entering the bounded region may be informed that there is a gas station within a half mile.

Many vehicles gather and report data as regular functions. For example, fleet managers can track a variety of vehicle metrics, including economy, speed, locations, etc. Vehicles with a defined purpose, e.g., a security truck, may utilize much more intensive data gathering, such as active camera feeds, security alerts, etc. If the data is actively reported to a fleet central location, such as may be necessary in security instances, a significant cost of data-overhead may be incurred.

SUMMARY

In a first illustrative embodiment, a system includes at least one processor, of a vehicle, enabled to wirelessly receive configuration data defining data-gathering and data-reporting parameters associated with at least one context. The processor is also enabled to define data to be gathered by the vehicle related to the context and, as the vehicle travels, gather the defined data. The processor is further enabled to compare the gathered data to the at least one context to determine if there is a correlation between at least one of the at least one contexts and the gathered data, and responsive to there being a correlation, set vehicle data-gathering and data-reporting based on the parameters associated with the context to which the gathered data correlates.

In a second illustrative embodiment, a system includes at least one processor, of a vehicle, enabled to wirelessly receive configuration data defining data-gathering and data-reporting parameters associated with at least one context, while the vehicle is traveling. The processor is further enabled to, responsive to the receipt of the data, define data to be gathered by the vehicle related to the context. The processor is additionally enabled to gather the defined data at a first available opportunity and compare the gathered data to the at least one context to determine if there is a correlation between at least one of the at least one contexts and the gathered data. Further, the processor is enabled to, responsive to there being a correlation, set vehicle data-gathering and data-reporting based on the parameters associated with the context to which the gathered data correlates.

In a third illustrative embodiment, a system includes at least one processor, of a vehicle, enabled to wirelessly receive configuration data defining data-gathering and data-reporting parameters associated with at least one context, wherein the parameters define at least one of a type of data to be gathered, a volume of data to be gathered, a type of sensor to be utilized in data gathering, a volume of data to be reported or a type of network to use in reporting data, and wherein the context includes at least one of a geo-fence, a vehicle data snapshot, an occurrence of a vehicle-detectable condition, a vehicle task, or a context external to the vehicle. The processor is also enabled to define data to be gathered by the vehicle related to the context and as the vehicle travels, gather the defined data. Further, the processor is enabled to compare the gathered data to the at least one context to determine if there is a correlation between at least one of the at least one contexts and the gathered data, and, responsive to there being a correlation, set vehicle data-gathering and data-reporting based on the parameters associated with the context to which the gathered data correlates.

BRIEF DESCRIPTION OF THE DRAWINGS

FIG. 2 shows an illustrative configuration process;

FIG. 3 shows an illustrative reconfiguration process;

DETAILED DESCRIPTION

Figure 1:
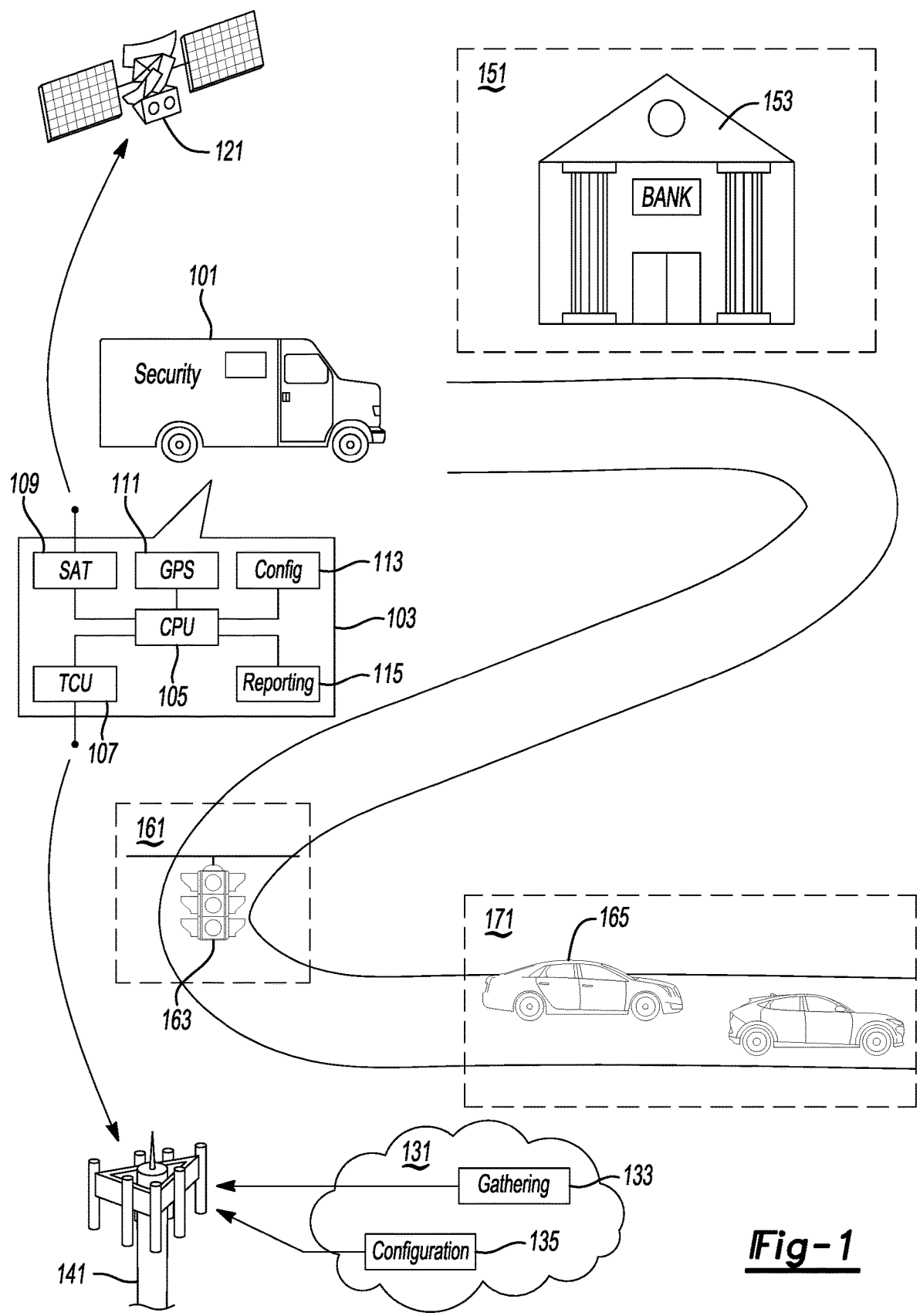
FIG. 1 shows an illustrative data gathering system along with illustrative locations of interest.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments allow for use of data snapshots as one example of how to use geofencing or define geofences. Examples of the concept of data snapshots are generally described in co-owned and co-assigned U.S. Pat. No. 10,486,709, filed on Jan. 19, 2019 and granted on Nov. 26, 2019, the contents of which are hereby incorporated by reference. The use of data snapshots to define geofences is described in co-pending and co-owned U.S. application Ser. No. 17/097,119, filed on Nob. 13, 2020, entitled ADAPTIVE GEOFENCING REACTIVE TO VEHICLE DYNAMIC OBSERVATIONS, the contents of which are hereby incorporated by reference. The application is generally incorporated by reference and also the specific embodiments related to data snapshots and their use in conjunction with geofences are specifically incorporated by reference. Generally speaking, without limitation, a vehicle data snapshot includes data and events detected by various vehicle sensors, that may include, but which are not limited to, control sensors, cameras, LIDAR, RADAR, user inputs, wireless communication systems, etc.

The illustrative embodiments are described in the context of fleet management, however the techniques and apparatuses are applicable to data-gathering and dynamic configuration under a variety of conditions that do not necessarily require fleet management to be reasonable to implement. Through the use of the embodiments and the like, vehicles can better utilize limited resources, and on-demand dynamic reconfiguration of data gathering, reporting and other configurable vehicle system can be obtained.

Through the use of vehicle data snapshots, while not necessary, advanced reconfiguration responsive to a variety of sensor-detected conditions, some of which may not even be perceptible to a driver, may be obtained. For example, a security vehicle traveling over slippery pavement may implement enhanced reporting, as the possibility of a crash has increased, and thus the load must be more carefully monitored. In other instances, a hazard may be detected some distance from a location, unobservable by a user, but one that dictates increased reporting. For example, a riot breaking out within proximity to a teenager's location may cause increased reporting in a vehicle proximate to a riot, as a parent may want to ensure the safety of the child. The parent may not have specified a riot, but may have specified that certain "critical alerts" in proximity to a child location should trigger increased reporting. In this manner, even though the riot did not have an actual geofence predefined therewith, the vehicle could effectively have a plurality of geo fences traveling therewith (e.g., 2 miles for critical conditions, 4 miles for dangerous weather, 1 mile for traffic conditions, etc.) and if a corresponding event "passes within" the vehicle geofence (by virtue of the vehicle moving), and a new configuration can be implemented and take hold.

Because the fences and conditions can be dynamically adapted, a parent or fleet manager, for example, could reconfigure the fences and/or corresponding parameters at any moment in time, and the vehicle, in communication with a cloud configurator process, could upload the new requirements or fences and any according changes to the configuration to be applied, and thus the vehicle is capable of near instantaneous reaction to new conditions or configurations.

In other instances, a fleet manager may have a mandate to save on data overhead costs, which can massively scale with the size of a fleet and significant gathering and reporting. Since many vehicles will not need to actively gather significant data during the entire course of a journey, for example, the fleet manager can more closely control what is gathered and reported when, as opposed to either leaving all gathering and reporting on in an abundance of caution or turning too much gathering and reporting off and risking incident.

The fleet manager need not even define geofences specifically. For example, a fleet manager may have access to a data provision service that provides dynamic risk profiles for security vehicles. Within X miles of a police station, the risk profile may be low, and thus the manager may not need to know where police stations are, but rather any time the security vehicle is within that distance of a police station, data reporting can diminish. In other times, certain weather or other dynamic impediments may temporarily increase risk, and so enhanced data gathering and reporting could be immediately turned on responsive to proximity to such risk, and disabled or diminished when the risk receded. In this manner, the fleet manager can both manage costs associated with data while preserving a robust data gathering strategy without sacrificing risk of incident in order to save on costs.

Similar strategies can be applied by parents. For example, a city may be X % safe during a day, but at night certain areas diminish in safety. As a function of time of day and location of vehicle, the child's vehicle may have increased or decreased data gathering engaged. A spouse may want data gathering and reporting increased when a child is with the other spouse in a vehicle, in case of incident. Any variety of situations can allow for the dynamic adaptation of configurations for gathering, reporting and other configurable features without overloading a data network that is constantly under the strain of an ever-increasing flow of data, and while keeping costs at a minimum.

FIG. 1 shows an illustrative data gathering system along with illustrative locations of interest. In this example, a fleet vehicle 101, a security truck, has a plurality of onboard systems 103. These may be connected to one or more processors 105, and can include, for example, sensors, cameras, and communication connections such as telematics control unit 107 and satellite uplink 109. The vehicle systems 103 may utilize GPS or other coordinates to determine the applicability of configurations and the location of the vehicle 101. An onboard configuration process 113 may store active configurations, possible configurations and any other relevant data. A reporting process 115 or other reconfigurable processes may utilize the coordinates and configurations to adapt to a variety of conditions and situations.

In this example, a portion of a vehicle route will be described with respect to what can occur when the vehicle 101 travels to various locations expected along a route. The vehicle 101 may utilize a satellite 121 and cellular network 141 to maintain communication with a central network 131 gathering process 133.

When the vehicle 101 approaches the bank 153, heightened security may be implemented responsive to instructions from a configuration process 135 that is adaptable by a fleet manager at any time. In this example, vehicle cameras will be activated and reporting frequency will be increased in response to traveling within a certain distance 151 of the destination where it is known that the vehicle 101 will be stopping and transferring money. This would be an instance of a very high degree of gathering and reporting that could be very cost-intensive.

As the vehicle 101 leaves the area 151, it may revert to a city-street level of gathering and reporting, since incident likelihood may be generally diminished in such situations. This would be the application of a second configuration responsive to leaving fence 151 or to traveling on a street having a certain designation by the configuration process.

Along the route, there may be a number of situations where security risk may slightly increase, such as at stop signs or street lights 163. These can be fenced or designated by map data, and reaching proximity to such a device or location 161 may cause a slightly higher frequency of reporting. Then, as the vehicle 101 travels away from the location 161, the configuration may dictate reversion to the lower reporting level.

If the vehicle 101 passes onto a highway 171 with limited traffic 165, a lowest level of reporting may be triggered because of the very low likelihood if incident in such situations. Again, these levels are just illustrative in nature, and are not indicative of necessarily correct situation reporting, but rather what a fleet manager of a security fleet may dictate when configuring dynamic reporting and with a desire to save data by diminishing reporting when not deemed necessary.

As fleet and other vehicles travel, they can also gather vehicle data snapshots and if a fleet manager identifies a situation warranting enhanced scrutiny, a new configuration can be appended to the snapshot in the configuration process. Then, other vehicles 101 observing similar conditions can apply the new configuration settings in order to keep the fleet responsive to whatever was the most recently deemed applicable condition for configuration changes.

FIG. 2 shows an illustrative configuration process. This is an example of a process that can be used to set up a configuration process 135 in the cloud 131 that can disseminate configuration information to a vehicle 101, or a configuration process 113 that can be set up with respect to a specific vehicle 101. Vehicles 101 can store and/or receive multiple configurations in a pre-loaded or on-demand manner. The configurations can dictate data gathering parameters, data reporting parameters, and use of other configurable vehicle systems.

For example, it may require significant power to utilize certain vehicle sensors in an ongoing manner, so certain sensors may only be engaged under certain circumstances in order to preserve power. In other instances, the cost of sending high amounts of data may be significant, so certain volumes of data, types of data or even networks (cellular, vs. paid Wi-Fi, vs. free Wi-Fi) may only be used under certain conditions. At a location-by-location basis, an interested party can dynamically adapt a vehicle's configuration in an ongoing manner without actually having to be present or even specifically know what is happening around the vehicle 101. Instead, the configurations can be defined in terms of context, and when a given context applies, a given configuration can apply.

The user can begin configuring context or a vehicle in general at 201. This can include defining specific or a default set of settings (settings to be used when no other modified settings are utilized). The user can define a context or variable that may or may not be present, or tie settings to a specific geo-fence (e.g., specific coordinates) or a specific type of geo-fence (e.g., any set bounding a business of type X or an instance of Y, such as a vehicle-stop).

Each configurable factor (e.g., networks to be used, volume of data to be reported, frequency of reporting, system utilization, etc.) can be defined at 203 and each context to which a set of parameters applies can be defined at 205. Context can include reference to locations, reference to an exemplary vehicle-snapshot or portions of a snapshot, types of occurrence, traffic, weather, etc. The definitions of contexts and assignment of parameters/factors can occur at this step, or, for example, a context can be defined for a given set of parameters that was just established.

Context can additionally include a task defined at 207. For example, driving to work could be an individual user task, or for a fleet manager, whose vehicles may be used for a variety of purposes, the task could relate to tasks for which vehicles are used. Vehicles designated for pick-up, for example, may have enhanced measures engaged following a pick-up stop, but lower reporting until then. Vehicles designated for delivery, on the other hand, may have enhanced measures applied until reaching the delivery stop, and then decreased measures applied thereafter. Vehicles may have a designated task associated therewith and/or may be utilized for a variety of tasks that can be input as the vehicle is used or associated with a given operator, time of day, location, etc. Tasks can receive parameters definitions as can contexts, or tasks can be defined following creation of parameters/factors and associated therewith. A task may be a planned usage for a vehicle, for example, and a context may be something that can occur dynamically, although a task can also be a context.

The configured parameters are then uploaded to a configuration process 135 in the cloud 131 or onto a vehicle 101 directly into a configuration process 113. Cloud-loaded configurations can be disseminated to fleet or owned vehicles 101 following upload to the cloud, to ensure compliance, and direct configurations can be immediately applied when a given context associated with a configuration set of parameters is detected by a vehicle 101.

FIG. 3 shows an illustrative reconfiguration process. This process is an example of what may occur onboard a vehicle 101 as the vehicle 101 begins and progresses through a journey. Application of existing and newly configured parameters being applied are demonstrated as examples throughout.

In this example, the vehicle 101 begins a journey at 301, which can include setting out on a task from a start location, or setting out on a new task following completion of a previous task. The process 113 determines if the vehicle 101 has an assigned task at 303, which can be designated based on a time of day, initial vehicle location, preassigned task from a fleet manager, input by an operator, determined based on a destination, etc.

If there is a task assigned at 303, the process 113 attempts to obtain a configuration associated with the task at 305. This can include reference to an onboard configuration or a request to the cloud configuration process 135 for a remote configuration that may have been added by a fleet manager. If there is a configuration that corresponds to the task found at 307, the process 113 may apply the parameters associated with that configuration at 309.

A "task" does not always have to be a task, but can also be a context or other similar variable condition. Task is used as an example because fleet managers will often dispatch vehicles for tasks, but any sort of variable condition can be a trigger for applying or obtaining then applying parameters. If no context or task matching the current context or task is found, the process 113 may choose between a closest match and/or default parameters, or may give an operator or an owner or manager an opportunity to select which parameters should be used.

The process 113 may also have the opportunity to apply other parameters at 311, which could include parameters related to another context or default parameters for a time of day or general parameters. For example, the fleet manager could designate some number of override parameters for a given task, but then may also want general non-overlapping parameters to be applied as well, which could be parameters associated with a certain type of fleet vehicle or another general context unrelated to the present task.

If there are no more parameters to be applied, the process 113 may then track the progress of the vehicle 101 along the route or through the day at 321. If any triggers for implementing a revision of data gathering, data reporting or other configurations are tripped, the process will implement those changes as dictated by a given configuration.

Also, during the tracking, there may be updates to the cloud configurator and/or that get pushed to the vehicle from the cloud or directly from another computer (e.g., an owner device, such as a cellular phone or PC or a fleet manager computer). Since an owner can potentially reconfigure data reporting and other configurations on-demand, the owner can react to a situation as it arises. For example, a child could call and say they are driving to a less-safe area, and the owner can implement one or more increased reporting features. Or account data could be running low, and the owner could diminish reporting in order to preserve data. The vehicle does not have to be in the owner's possession, and the changes can be near instantaneous.

If there is an update to a configuration at 323, the process will apply any new configuration settings at 327. This can include immediate implementation of a configuration or merely storing the configuration onboard 113 and tracking for any triggers associated with the new configuration, making changes if and when a new trigger is met.

Until the trip is complete at 325, the process will continue to monitor for any new changes and implement or save the changes as necessary. Once the trip has completed, the process may reset the vehicle 101 at 329, which can include a reversion to a default set of parameters or at least a clearing of a set task stored onboard. This is not necessary, but may be useful to reset fleet vehicles at the close of business each day.

If there was no task assigned at 303, the process may determine if there are default configuration, gathering and reporting settings for the vehicle at 313. One or more vehicles in a fleet, or personal vehicles 101, may have default settings for non-task-oriented travel, and may only apply enhanced settings when a task is designated. If there are no default settings found onboard or in the cloud at 315, the process may use the last set of settings that was applied to the vehicle 101 at 319, if those settings are still available. If default settings are found, the process may apply the default parameters. Default settings may be designated for various states, for example, a vehicle may have different default settings for a day trip, evening trip, weekend trip, etc.

Figure 4:
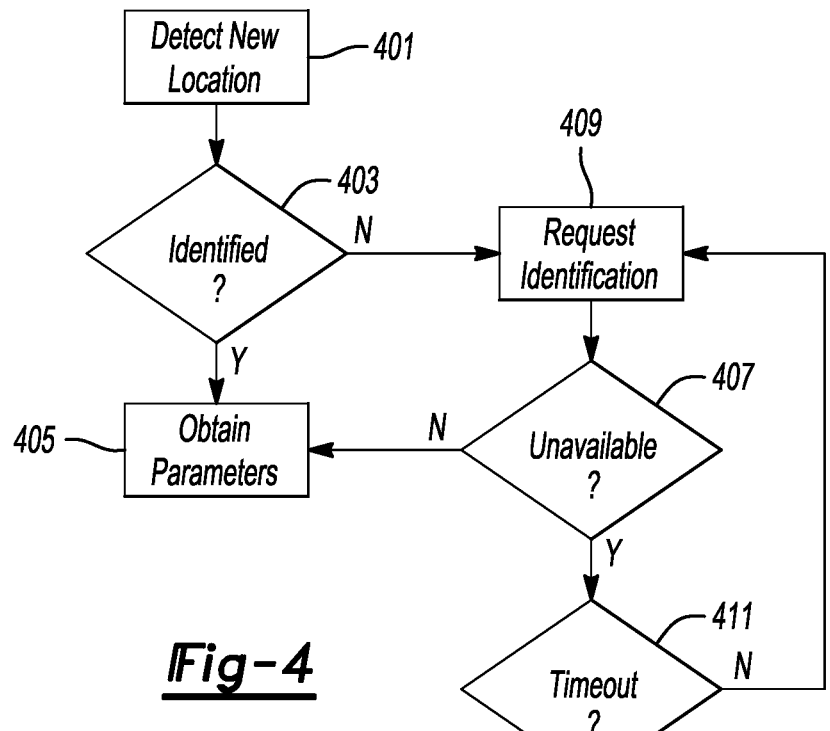
FIG. 4 shows an illustrative dynamic adaptation process.

FIG. 4 shows an illustrative dynamic adaptation process. In this example, the vehicle 101 may encounter a new location, location type, condition, etc. at 401. Since a variety of configurations may be stored in the cloud, the vehicle 101 may ask the cloud for identification of the new location at 405, if the vehicle does not have an onboard identification possible.

If the vehicle can identify the location based on onboard information, or if the cloud includes available identification of the information at 407, then the vehicle 101 can obtain any configuration parameters associated with the location or location type. This concept can apply to any new context, not simply locations, and is described in terms of location for the sake of illustration only.

Encountering a new location may also cause an alert to be sent to an owner or fleet manager, giving them an opportunity to define reporting or configuration parameters for the location/context. Accordingly, the process may need to delay temporarily while the new configuration is established and uploaded, and so until a timeout passes at 411, the process may continue to check for identification and configuration information. If a timeout occurs, the process will utilize any default available parameters for the new location or may use a best-match based on existing locations/context, even if there is not an exact match found.

Figure 5:
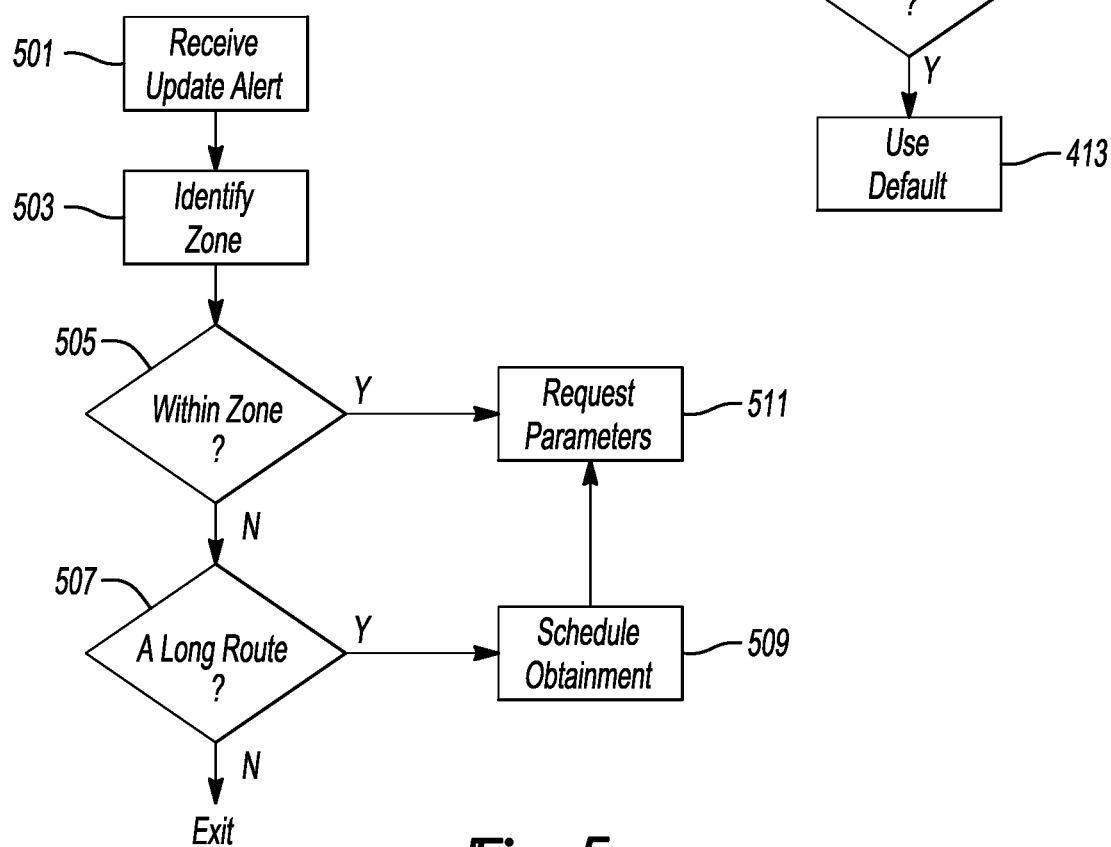
FIG. 5 shows an illustrative on-demand reconfiguration process.

FIG. 5 shows an illustrative on-demand reconfiguration process. In this example, the vehicle 101 receives an update to a configuration at 501. The configuration may specify a new context, e.g., geo-fence, data-snapshot for comparison, condition, etc. The configuration may also specify new settings, such as increased or decreased sensor usage, increased or decreased reporting, different communication medium usage, etc.

The process considers a current location/zone/context at 503 to determine if any new triggers apply to the current location. This can include, for example, comparing current coordinates to a new geo-fence, taking and comparing a data-snapshot to a triggering data-snapshot, comparing other sensed conditions to triggering conditions, etc.

If the vehicle 101 is currently within a zone or meets the specified context at 505, the process may request parameters for application at 511. In some instances the parameters may have been included with the new context definition, in other instances the vehicle 101 may obtain the parameters separately from a configuration process 135.

If the vehicle 101 is not currently within a zone or under applicable context, the process may determine if any instances of the context appear along a current route at 507. If the context is a geo-fence, location, location type, or other factor that can be determined ahead, then the vehicle 101 can check a current planned route for any context. If the context is comparison of a vehicle data snapshot, the lookahead may not be as easy, unless one or more data snapshots already exist for other points along the route and the context is something that is unlikely to change (e.g., a clearance) as opposed to weather or another variable condition.

For example, a fleet manager may have dispatched a plurality of new trucks with a clearance requirement of 10 feet. One of those trucks may encounter a 10 foot 3 inch clearance resulting in a collision. The fleet manager may then immediately request for all trucks that encounter clearances that are between 10 feet and 10 feet six inches to aggressive sense, gather and report data as those trucks encounter the clearance, to determine if this is an ongoing issue or just a one-off issue experienced by the single vehicle.

For any planned routes, clearances may be known from map data or may have been gathered for some overhangs based on prior vehicle data snapshots. Thus, many vehicles can determine if at least some clearances on their route include the new trigger. Those vehicles will also need the new parameters and can schedule obtainment of those parameters for a time prior to reaching a new clearance at 509. For any vehicles to which the context does not appear to apply, the vehicles can obtain the parameters when they return to their storage location, from a local Wi-Fi connection, for example, which is free.

While it may seem that it is reasonable to simply send the new configuration file with the new context identification, fleet managers managing thousands of vehicles and handling hundreds of dynamic requests may be pushing out significant data changes regularly, and so this process provides an example where a lesser amount of data (the context) can be sent and then the parameters can be obtained at cost (using cellular or cost-based networks) as needed, and otherwise simply downloaded when free communication is available.

The illustrative embodiments improve the ability of vehicles to adaptively react to changing conditions by allowing for dynamic reconfiguration of a variety of systems and instructions responsive to virtually any condition that can be analyzed by the vehicle (or a cloud process acting on behalf of the vehicle). Thus, instead of needing to have a vehicle in possession, the vehicles can be reconfigured on demand, and further can adapt configurations in an ongoing manner to preserve data, reduce overhead, preserve power, increase safety, etc.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:
   at least one processor, of a vehicle, enabled to:
   wirelessly receive configuration data defining data-gathering and data-reporting parameters associated with at least one context;
   define data to be gathered by the vehicle related to the context;
   as the vehicle travels, gather the defined data;
   compare the gathered data to the at least one context to determine if there is a correlation between at least one of the at least one contexts and the gathered data; and
   responsive to there being a correlation, set vehicle data-gathering and data-reporting based on the parameters associated with the context to which the gathered data correlates.

2. The system of claim 1, wherein the context includes a geo-fence.

3. The system of claim 1, wherein the context includes a vehicle data snapshot.

4. The system of claim 1, wherein the context includes an occurrence of a vehicle-detectable condition.

5. The system of claim 1, wherein the context includes a vehicle task.

6. The system of claim 5, wherein the defined data includes a current-task to which the vehicle is assigned, and wherein the task is received at the vehicle from a source remote from the vehicle.

7. The system of claim 1, wherein the context includes a context external to the vehicle.

8. The system of claim 7, wherein the context includes at least one traffic condition.

9. The system of claim 7, wherein the context includes at least one environmental condition.

10. The system of claim 7, wherein the context includes at least one temporal condition.

11. The system of claim 1, wherein the parameters define at least a type of data to be gathered.

12. The system of claim 1, wherein the parameters define at least a volume of data to be gathered.

13. The system of claim 1, wherein the parameters define at least a type of sensor to be utilized in data gathering.

14. The system of claim 1, wherein the parameters define at least a volume of data to be reported.

15. The system of claim 1, wherein the parameters define at least a type of network to use in reporting data.

16. A system comprising:
   at least one processor, of a vehicle, enabled to:
   wirelessly receive configuration data defining data-gathering and data-reporting parameters associated with at least one context, while the vehicle is traveling;
   responsive to the receipt of the data, define data to be gathered by the vehicle related to the context;
   gather the defined data at a first available opportunity;
   compare the gathered data to the at least one context to determine if there is a correlation between at least one of the at least one contexts and the gathered data; and
   responsive to there being a correlation, set vehicle data-gathering and data-reporting based on the parameters associated with the context to which the gathered data correlates.

17. The system of claim 16, wherein the parameters define at least one of a type of data to be gathered, a volume of data to be gathered, a type of sensor to be utilized in data gathering, a volume of data to be reported or a type of network to use in reporting data.

18. The system of claim 16, wherein the context includes at least one of a geo-fence, a vehicle data snapshot, an occurrence of a vehicle-detectable condition, a vehicle task, or a context external to the vehicle.

19. A system comprising:
at least one processor, of a vehicle, enabled to:
wirelessly receive configuration data defining data-gathering and data-reporting parameters associated with at least one context, wherein the parameters define at least one of a type of data to be gathered, a volume of data to be gathered, a type of sensor to be utilized in data gathering, a volume of data to be reported or a type of network to use in reporting data, and wherein the context includes at least one of a geo-fence, a vehicle data snapshot, an occurrence of a vehicle-detectable condition, a vehicle task, or a context external to the vehicle;

define data to be gathered by the vehicle related to the context;
as the vehicle travels, gather the defined data;
compare the gathered data to the at least one context to determine if there is a correlation between at least one of the at least one contexts and the gathered data; and
responsive to there being a correlation, set vehicle data-gathering and data-reporting based on the parameters associated with the context to which the gathered data correlates.

20. The system of claim 19, wherein:
the defined data includes a current-task to which the vehicle is assigned,
the task is received at the vehicle from a source remote from the vehicle,
the context external to the vehicle includes at least one of a traffic condition, at least one environmental condition, or a least one temporal condition.

\* \* \* \* \*